(12) United States Patent
Boonpongmanee et al.

(10) Patent No.: US 8,875,850 B2
(45) Date of Patent: Nov. 4, 2014

(54) DISC BRAKE ASSEMBLY AND METHOD OF MAKING SAME

(71) Applicants: Thaveesak Boonpongmanee, Westlake, OH (US); Edward Lee Luehring, Lakewood, OH (US)

(72) Inventors: Thaveesak Boonpongmanee, Westlake, OH (US); Edward Lee Luehring, Lakewood, OH (US)

(73) Assignee: Eaton Corporation, Cleveland, OH (US)

(*) Notice: Subject to any disclaimer, the term of this patent is extended or adjusted under 35 U.S.C. 154(b) by 104 days.

(21) Appl. No.: 13/773,747

(22) Filed: Feb. 22, 2013

(65) Prior Publication Data

US 2014/0238789 A1    Aug. 28, 2014

(51) Int. Cl.
*F16D 55/18*      (2006.01)
*F16D 55/02*      (2006.01)

(52) U.S. Cl.
CPC .................................. *F16D 55/025* (2013.01)
USPC ....... 188/72.4; 188/71.1; 188/71.5; 188/73.1; 188/170; 192/85.24; 192/85.4

(58) Field of Classification Search
CPC . F16D 2121/02; F16D 65/18; F16D 2125/06; F16D 55/06; F16D 55/32; F16D 55/40; F16D 55/226; F16D 55/227; F16D 2055/0058; F16D 2065/024
USPC ............ 188/72.4, 170, 72.5, 73.2, 71.7, 71.1, 188/71.4, 71.3, 71.2, 71.5, 366; 192/70.28, 192/85.37, 111.15, 70.26, 113.34, 85.41, 192/85.32, 85.4, 85.45, 85.24
See application file for complete search history.

(56) References Cited

U.S. PATENT DOCUMENTS

| | | | | |
|---|---|---|---|---|
| 2,778,451 | A | * | 1/1957 | Friedman .................... 188/73.32 |
| 2,847,102 | A | * | 8/1958 | Tiedeman et al. ......... 192/84.91 |
| 3,195,692 | A | * | 7/1965 | Ortlinghaus et al. ......... 188/170 |
| 3,335,834 | A | * | 8/1967 | Wach ......................... 192/70.12 |
| 4,638,894 | A | * | 1/1987 | Sitabkhan et al. ............ 188/170 |
| 4,907,683 | A | * | 3/1990 | Patel .......................... 192/85.37 |
| 6,148,980 | A | * | 11/2000 | Patel et al. ................... 192/52.4 |

* cited by examiner

*Primary Examiner* — Anna Momper
*Assistant Examiner* — San Aung
(74) *Attorney, Agent, or Firm* — Fay Sharpe LLP (57) ABSTRACT

A disc brake having one or multiple axially movable rotor discs with annular friction surfaces disposed axially between an annular piston in an annular pressure cavity formed in a housing and annular reaction plate attached to the piston. Friction pads are provided on the reaction plate and also on an axially movable annular reaction disc disposed between the rotor discs. A positioning plate is disposed between the piston and rotor discs and has axially movable poppets thereon, each with a friction pad for contacting the adjacent rotor disc. Individual springs on each poppet bias the poppet pads, rotor discs and friction pads axially together to provide a desired initial braking torque. Upon fluid pressure applied in the piston cavity, the housing moves the positioning plate to move the poppets to release braking torque.

11 Claims, 7 Drawing Sheets

DISC BRAKE ASSEMBLY AND METHOD OF MAKING SAME

BACKGROUND

The present disclosure relates to disc brake assembly having one or more rotating discs having annular friction surfaces thereon against which are forced stationary friction pads for applying a braking force to the rotating discs. In particular, the disclosure relates to disc brakes of the type having the brake friction pads urged into contact with the annular friction surface on the rotor disc by springs for providing the desired braking force break away or starting torque on the disc. This type of disc brake utilizes an annular piston responsive to applied fluid pressure in an annular pressure chamber to move the piston axially to release the piston pads from the annular disc and thereby release the braking force on the disc.

Disc brakes of the aforesaid type are used in heavy machinery applications such as oil well drilling rigs and surface mining equipment; and, in certain applications, may function as an emergency stop brake. One example of brakes of this type employs rotor discs having a diameter of 50 inches (127 cm) and having a break away or startup torque of 5,578,000 in-lbs (630,282 Newton meters).

Figure 6:
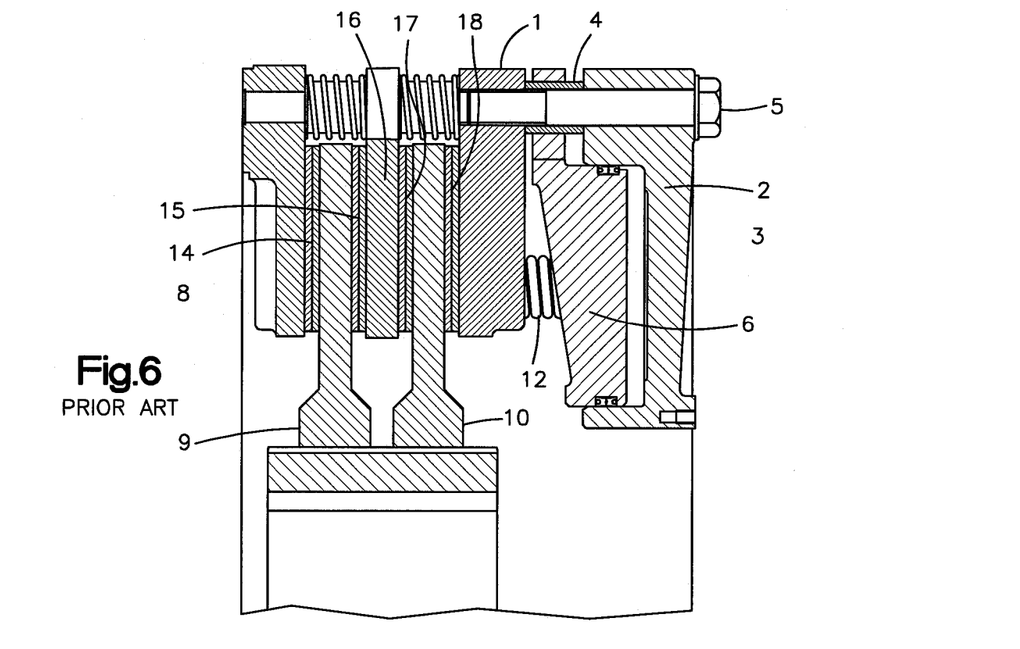
FIG. 6 is a portion of a section view similar to FIG. 2 showing a prior art disc brake assembly.
Figure 7:
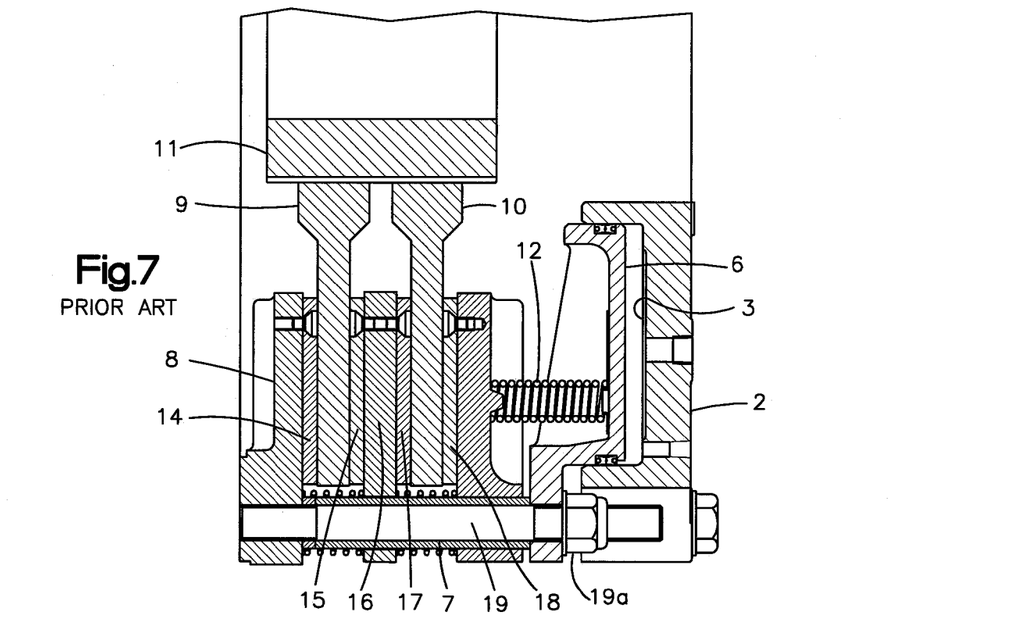
FIG. 7 is a view similar to FIG. 2 with a section view taken rotated from the section view of FIG. 6 for a prior art disc brake assembly.

Referring to FIGS. 6 and 7, the friction pads have heretofore been mounted on a pressure plate 1 secured by spacers 4 and bolts 5 to a housing 2 which forms the annular pressure chamber 3. An annular piston 6 disposed in the chamber 3 has apertures which are slidably positioned over spacers 4. The pressure plate 1 has apertures which are slidably received over spacers 7; and, the piston 6 is secured by a circumferential array of threaded studs 19 and lock nuts 19a over spacers 7 to an annular stationary mounting plate 8 such that fluid pressurization of the cavity results in axial movement of the housing and pressure plate 1. Rotor discs 9, 10 are received over a driving hub 11 and splined thereon to permit axial movement of the disc on spline 10 with respect to the hub 11 while maintaining rotary driving engagement with the hub. A plurality of brake pressure springs 12 are disposed in a circumferential array about the piston 6 with one end of each spring registered against piston 6 and the opposite end of each spring registered against the pressure plate 1. In operation, without fluid pressure in chamber 3, the springs 12 force the pressure plate 1 and housing 2 in a leftward direction in FIGS. 6 and 7 thereby compressing friction pads 14 disposed about the rotor disc 9 against the annular friction surface of the rotor and moves the rotor disc 9 into contact with friction pads 15 mounted on an axially movable annular reaction plate 16, which is slidably movable axially on the spacers 7, but restrained from rotation by the bolts 19 and spacers 7. Reaction plate 16 has friction pads 17 disposed thereabout which are forced against an annular friction surface on a second rotor disc 10 which moves axially against friction pads 18 provided on the pressure plate 1 thereby compressing all of the friction pads against all of the friction surfaces on the rotors and effecting a desired stopping torque.

In operation, when fluid pressure is applied in the chamber 3, the housing 2 moves and moves the pressure plate 1 in a rightward direction, compressing springs 12 against pressure plate 1, thereby releasing pressure on the friction pads 14, 15, 17, 18, movable plate 16, rotor discs 9, 10 and pressure plate 1 for releasing the braking action on rotor discs 9, 10.

The aforesaid prior art brakes have, in service, suffered from cantilevered axial deflection of the radially inwardly region of the pressure plate 1 under the urging of the springs 12 such that the radially inner portion of pressure plate 1 is deflected axially leftward in FIGS. 6 and 7 which results in braking forces localized on the radially inward regions of the rotor discs; and, accordingly, a level of initial stopping torque less than desired is provided with the brake engaged. Accordingly, it has been desired to provide a way or means of eliminating the effects of bending of the reaction components of a disc brake and thereby achieving the desired initial stopping torque for a given design level of force on the friction pads by the springs.

SUMMARY

The present disclosure provides a disc brake assembly having one or more rotor discs having annular friction surfaces on opposite axial sides thereof with the discs axially movable by splined connection to a rotating shaft. An annular housing has an annular piston cavity into which is disposed an annular piston forming a fluid pressure chamber. The piston is bolted to an annular stationary mounting plate and spaced axially therefrom by spacers. A positioning plate is disposed axially between the piston and the adjacent rotor disc and has a plurality of circumferentially and radially spaced apertures provided therein. Each of the positioning plate apertures has disposed therein for a limited axial movement with respect thereto, a movable poppet, each poppet having a friction surface provided thereon adjacent the rotor disc. Each of the poppets is axially biased to have the friction surface thereon urged against the adjacent rotor disc by a spring disposed between the poppet and the piston; and, the force of the friction surface on the poppets axially moves the rotors against the friction pads and the friction pads against the rotors and a movable reaction plate between the rotor discs and the mounting plate bolted to the piston to effect a braking action under the force of the springs. The poppets are maintained in their desired position about the adjacent rotor disc but are otherwise free to move a limited amount in an axial direction under the urging of the springs. Upon introduction of fluid pressure into the fluid pressure chamber, the housing and positioning plate are moved axially away from the mounting plate; and, upon further motion of the housing and positioning plate, the poppets and friction surface thereon are released from contact with the adjacent rotor and, thus, braking force is released.

This brake assembly of the present disclosure thus provides the desired startup braking force by springs urging poppets individually against the rotor disc and thus provides uniform braking force on the friction surfaces of the rotor discs independent of deflection of the positioning plate thereby achieving the desired initial stopping torque.

DETAILED DESCRIPTION

Referring to FIGS. 1-5, a disc brake assembly according to the present disclosure is indicated generally at 20 and includes a housing 22 having a generally annular configuration with the inner periphery 24 thereof sized to permit passage of a rotating shaft of a desired diameter therethrough with a desired clearance. Housing 22 includes an annular cavity 26 which defines in cooperation with an annular piston 31 disposed therein, an annular fluid pressure chamber 30. Chamber 30 has a plurality of fluid pressure inlets 28 formed through housing 22. Piston 31 is sealed in the annular cavity 26 about the radially outer periphery thereof by suitable seal ring 32; and, the radially inner periphery of the cavity 26 is sealed about the piston 22 by an inner seal ring 34.

The annular piston 31 has a plurality of circumferentially spaced radially outwardly extending lugs 36 in peripherally spaced arrangement, each of which has an aperture 38 formed axially therethrough.

An annular stationary mounting which acts as a reaction plate 40 is disposed in axially spaced arrangement from the piston 31 and is spaced therefrom by tubular spacer 42 and secured to the piston by a threaded stud 44 passing through the spacer 42 with one end connected to plate 40 and the piston is secured over the threaded stud by a threaded lock nut 46. Mounting plate 40 has a plurality of circumferentially spaced mounting holes 41 disposed adjacent the outer periphery which holes enable bolting of the mounting plate to an unshown stationary support structure.

An axially floating annular reaction plate 48 is disposed between the annular mounting plate 40 and the piston 31; and, plate 48 has apertures 50 formed therein in a circumferentially spaced arrangement to coincide with the location of the threaded studs 44 so as to be axially freely movable thereal-ong. Plate 48 is secured from rotation by virtue of the threaded studs 44 passing therethrough apertures 50.

The axially floating reaction plate 48 is disposed between a pair of rotor discs 52, 54, each of which has on axially opposite sides thereof, annular friction surfaces respectively 56, 58, 60, 62. Each of the rotors 52, 54 has a hub respectively 64, 66 which is internally splined for driving connection with a power transmission shaft 68; and, the discs 52, 54 are free to move axially on the spline shaft 68.

The annular mounting plate 40 has an annular friction pad, or alternatively a plurality of arcuate pad segments disposed in annular array thereon, as denoted by reference numeral 70 which are disposed for contacting the annular friction surface 56 on rotor 52; and, pads 70 are secured to the mounting plate 40 by suitable fasteners such as screws 72. The axially floating reaction plate 48 has secured on one axial face thereof an annular friction pad or segmented pads 73 for contacting the friction surface 58 of the rotor disc 52. Disposed on the opposite side of the axially floating reaction plate 48 is another annular friction pad or segmented pads 76 which are secured onto plate 48 by suitable fasteners such as screws 78. The pads 76 are thus disposed for frictional contact with friction surface 60 and rotor disc 54.

A positioning plate 80 is disposed axially between rotor disc 54 and piston 31 and secured therein by a plurality of circumferentially spaced spacers 82. The plate 80 is secured by bolts 84 passing through apertures 86 provided in the housing 22; and, the bolts pass through each of the spacers 82 and are threadedly engaged in the positioning plate 80. The positioning plate 80 has a plurality of circumferentially spaced apertures 88 disposed in circumferentially spaced arrangement and located so as to coincide with each of the spacers 42 which are freely movable axially within the apertures 88.

Referring to FIGS. 2-5, positioning plate 80 has an additional array of apertures disposed radially inwardly of the apertures 90 and in circumferentially spaced arrangement as denoted by reference numeral 90. Each of the apertures 90 has disposed therein a poppet 92 which extends axially through the plate 80 in apertures 88 and each poppet has retaining flanges, respectively 94, 96, provided on the ends thereof on opposite sides of the plate 80. The flange 94 being disposed adjacent rotor disc 54 and has attached on an axial face thereof a friction surface, which is in the version shown in FIGS. 4 and 5 in the form of a separate pad 98 which is positioned for frictional contact with the annular axial face 62 of rotor disc 54.

Figure 5:
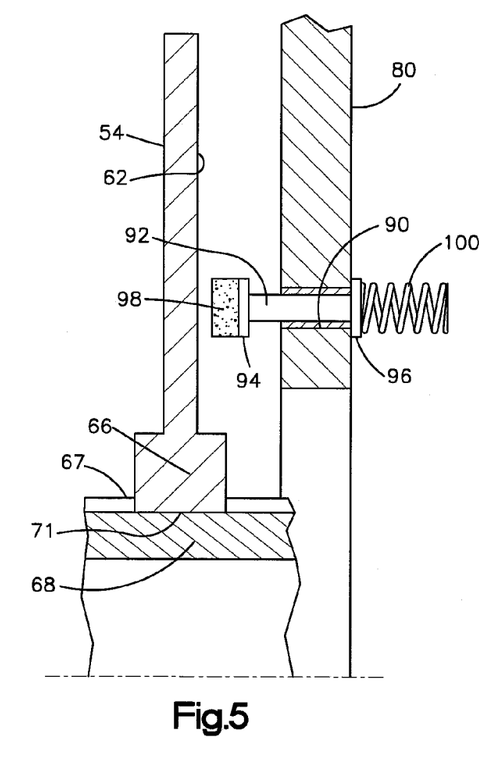
FIG. 5 is a view similar to FIG. 4 showing the brake pads on the poppets disengaged from the adjacent rotors.

Referring to FIG. 5, the positioning plate is shown as moved rightward a sufficient amount to cause the flange 96 on poppets 92 to register against the rightward face of plate 80, thus restraining further movement of the poppets in brake pads 98. Further movement of the housing 22 and positioning plate 80 rightward causes the poppets to remove their friction surface from the disc surface 62 to the position shown in FIG. 5 and to release all brake torque on the rotor discs.

Figure 8A:
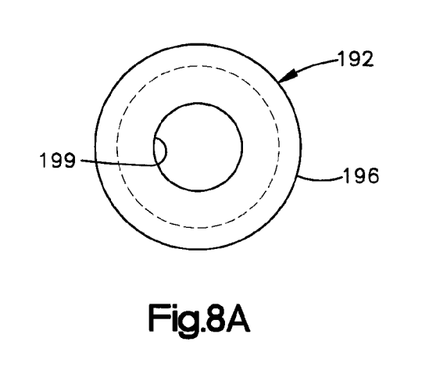
FIGS. 8a and 8b are, respectively, a top view and a front elevation view of another version of the poppet of the present disclosure.
Figure 8B:
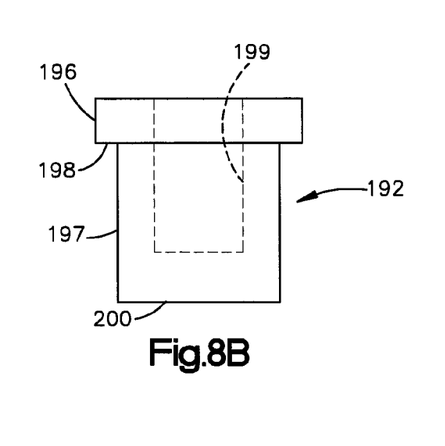

Referring to FIGS. 8a and 8b, another version of the poppet is indicated generally at 192 and has a body 197 having a radially outwardly extending flange 196, the undersurface of which, indicated at 198, is adapted to register against the surface of the positioning plate 80. The poppet 192 has a central cavity in the form of counterbore 199 which is adapted for receiving therein one end of one of the brake preload springs 100. The poppet 192 has the end surface 100 of the body 197 thereof formed as a friction surface integrally as one piece with the body of the poppet. In the present practice, the poppet is to be formed integrally as one piece from a composite of metal and ceramic, cermet or organic friction material.

Figure 9A:
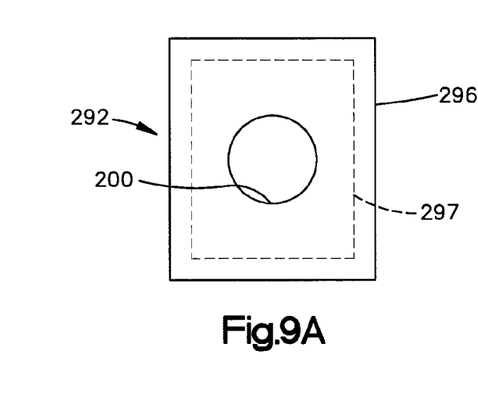
FIGS. 9a and 9b are, respectively, a top view and a front elevation view of another version of the poppet of the present disclosure.
Figure 9B:
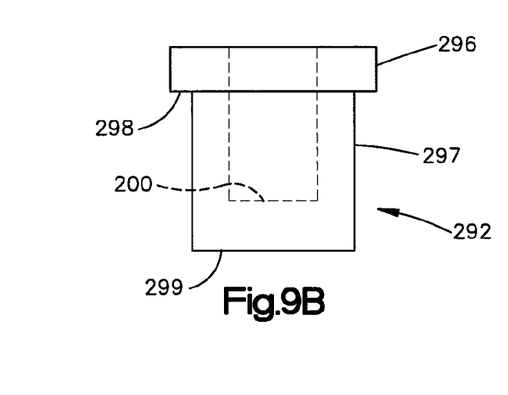

Referring to FIGS. 9a and 9b, another version of the poppet of the present disclosure is indicated generally at 292 and has a flange 296 having a rectangular configuration as does the body 297 of the poppet 292. The undersurface of flange 296 denoted 298 is adapted for contacting the surface of the positioning plate 80. The lower end surface 299 of the poppet body 297 is configured as a friction surface 299 and is formed integrally as one piece with the poppet body 297 and flange 296. The poppet 292 has a central cavity in the form of a counterbore 200 which receives therein the end of one of the poppet brake preload springs 100. In the present practice, the poppet 292 is to be formed of a cermet material providing the desired properties for the friction surface 299.

Figure 10A:
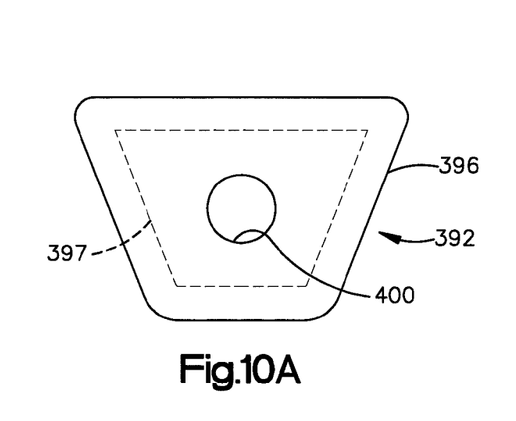
FIGS. 10a and 10b are, respectively, a top view and a front elevation view of another version of the poppet of the present disclosure; and, FIGS. 11a and 11b are, respectively, a top view and a front elevation view of still another version of the poppet of the present disclosure.
Figure 10B:
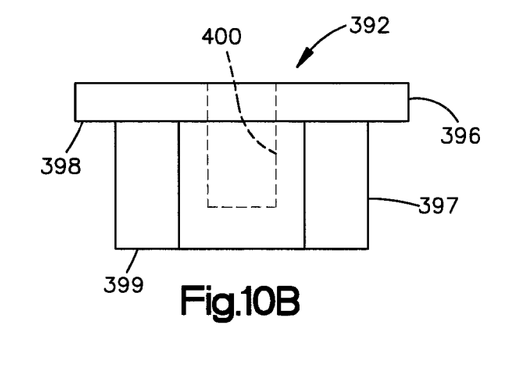

Referring to FIGS. 10a and 10b another version of the poppet of the present disclosure is indicated generally at 392 and has an outwardly extending flange 396 having a trapezoidal configuration as does the body 397 of the poppet 392. The flange 396 has the undersurface 398 thereof adapted for contacting the surface of the positioning plate 80. The poppet body 397 has the lower end face thereof, denoted 399, formed as a friction surface integrally as one piece with the poppet body 397. The poppet 392 has a cavity or counterbore 400 provided therein for receiving therein one end of one of the brake preload springs 100. In the present practice, the poppet 392 is formed integrally as one piece of a cermet material providing suitable properties for the friction surface 399.

Figure 11A:
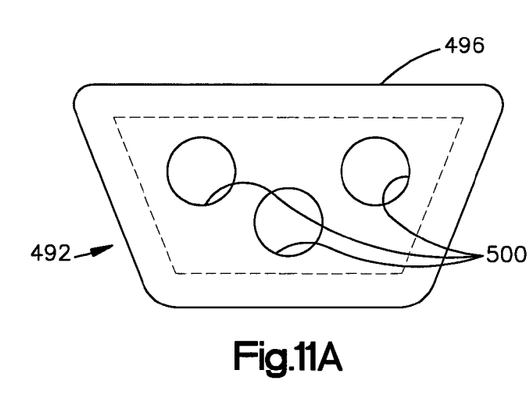
Figure 11B:
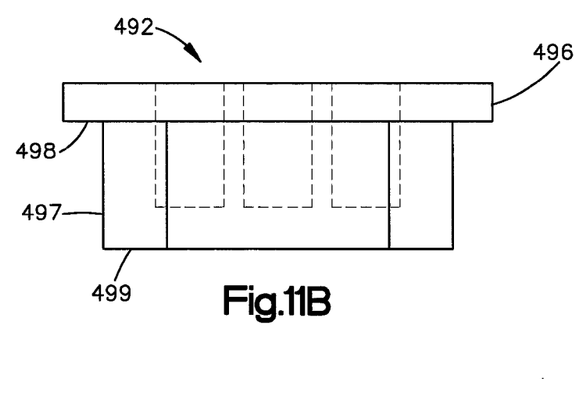

Referring to FIGS. 11*a* and 11*b*, another version of the poppet of the present disclosure is indicated generally at 492 and has an outwardly extending flange 496 having a trapezoidal configuration as does the body 497. The flange 496 has the undersurface 498 thereof configured for contacting the face of the positioning plate 80 to limit movement of the poppet. The lower end surface of the poppet 492, denoted 499, is configured to be a friction surface; and, surface 499 is formed integrally as one piece with the body of the poppet 497 and the flange 496. Poppet 492 has a plurality of counterbores or cavities denoted 500 provided therein, each for receiving a separate individual freeload spring 100 urging the poppet friction surface 499 into contact with the surface 62 of rotor disc 54. In the present practice, the poppet 492 is to be formed integrally as one piece of a cermet material.

Figure 1:
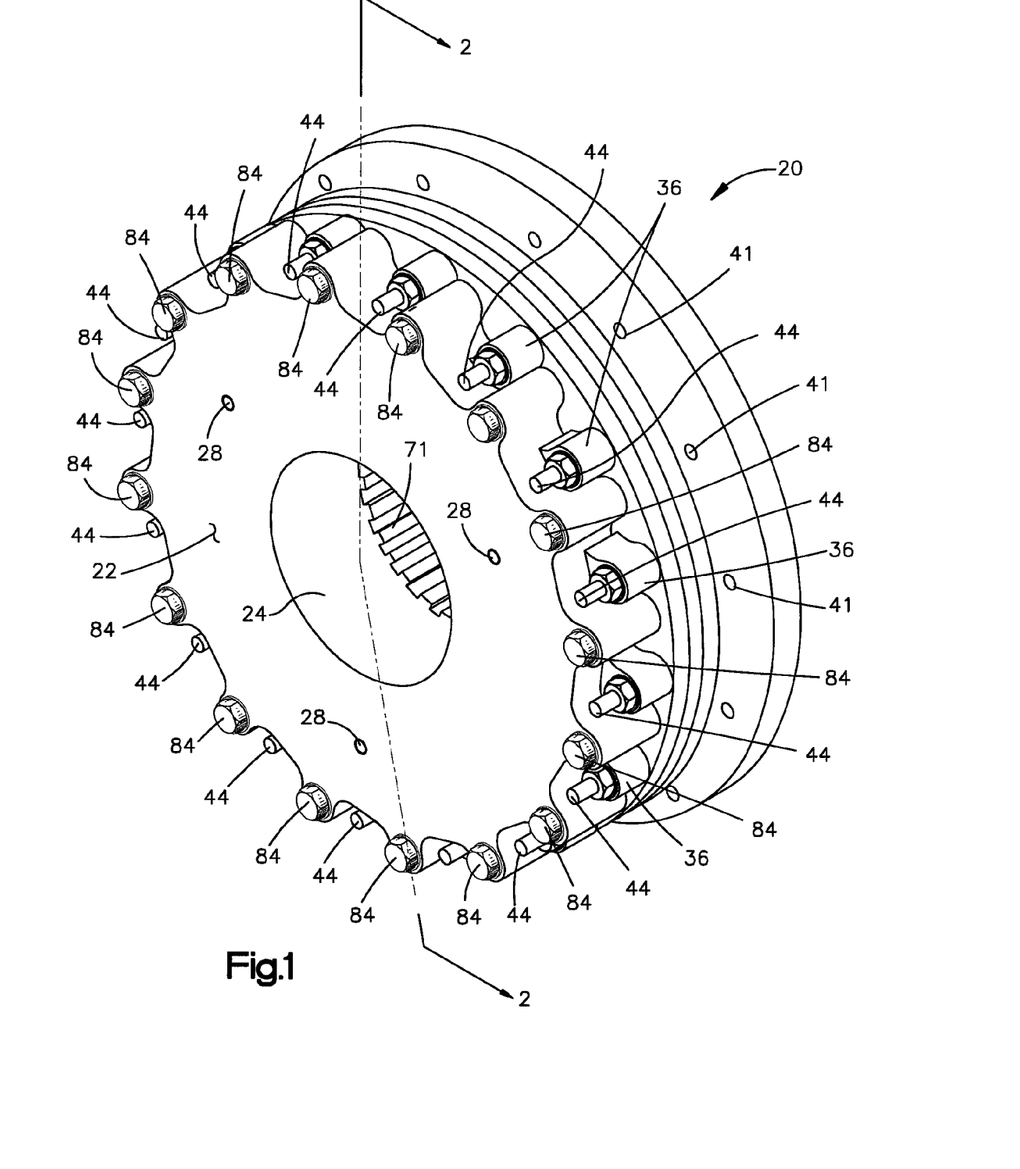
FIG. 1 is a perspective view of the disc brake assembly of the present disclosure.
Figure 2:
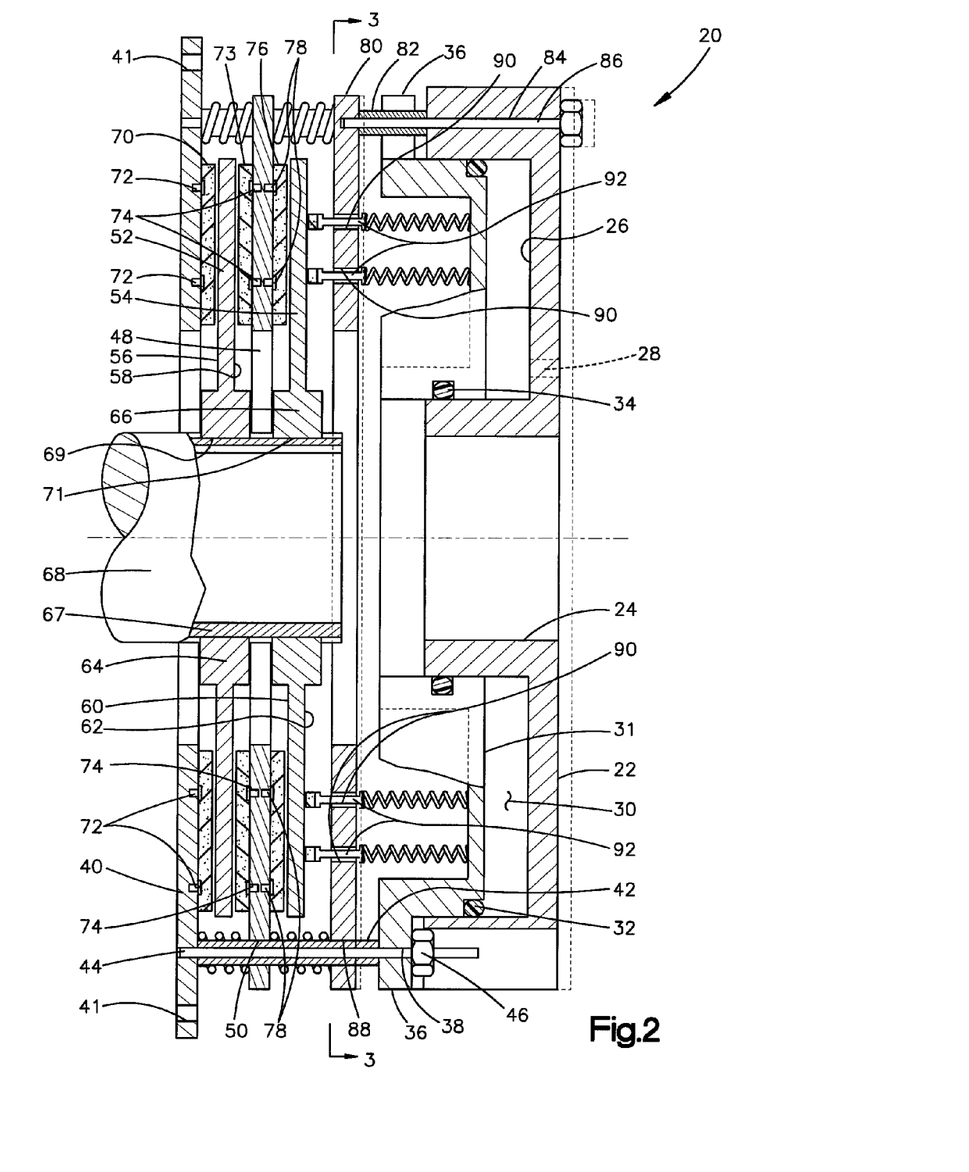
FIG. 2 is a cross-sectional view taken along section indicating lines 2-2 of FIG. 1.
Figure 3:
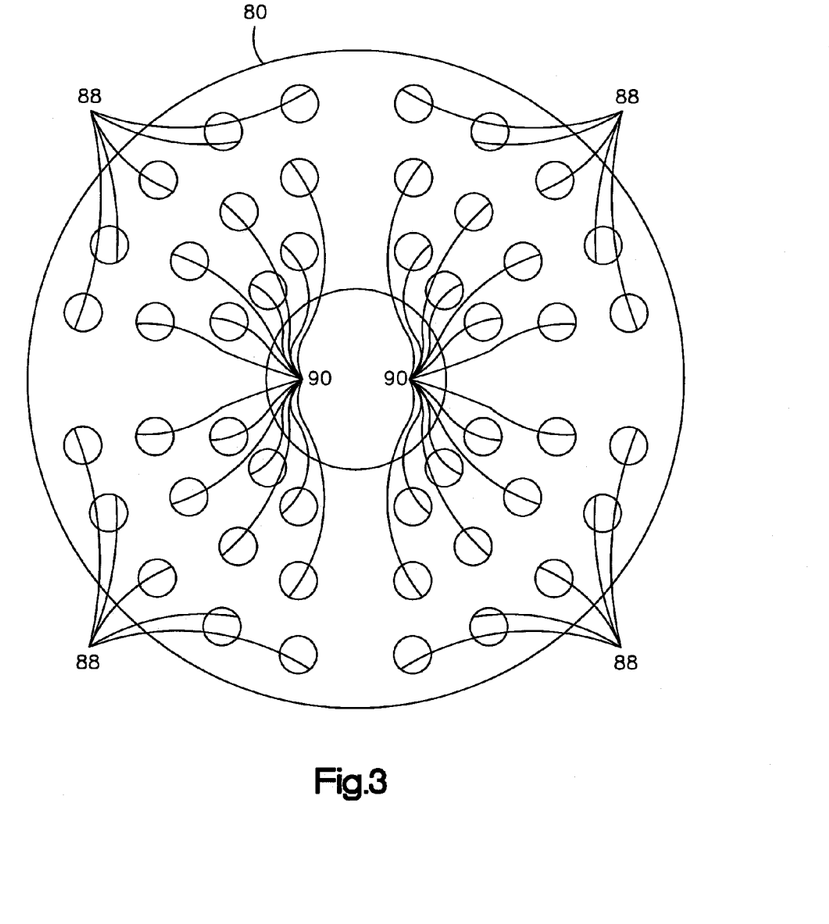
FIG. 3 is a cross-sectional view taken along section indicating lines 3-3 of FIG. 2 illustrating the positioning plate in plan view.
Figure 4:
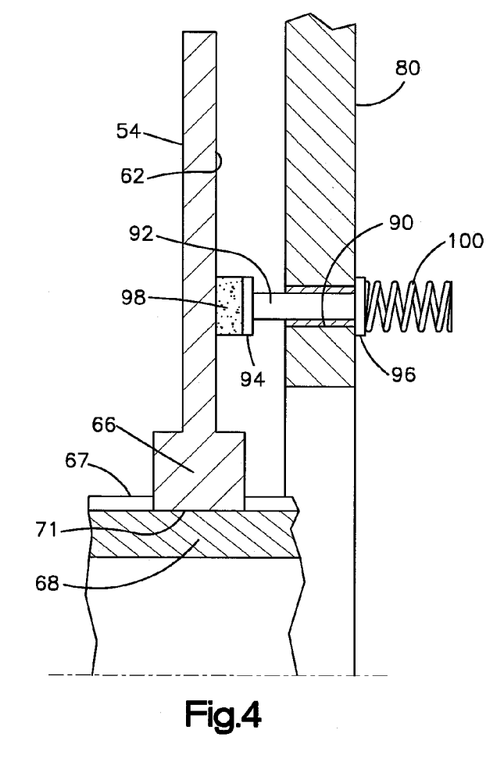
FIG. 4 is an enlarged view of a portion of FIG. 2 showing the brake pads on the poppets engaged with adjacent rotor.

In operation, the brake springs 100 urge the poppets 92 axially leftward in FIG. 4 until the brake pad 98 contacts the surface 62 of the rotor disc 54. Rotor disc 54, in turn, moves axially on the shaft 68 causing the annular friction surface 60 on rotor 54 to contact the friction pad 76 on axially floating reaction plate 48. Reaction plate 48 is thus urged leftward to cause brake friction pads 73 thereon to contact the annular friction surface 58 on rotor 52 which, in turn, causes rotor 52 to move axially causing the friction surface thereon to contact brake pads 70 on the mounting plate 40, thus providing brake locking torque on the rotor discs to prevent rotation thereof.

The disc brake of the present disclosure thus provides a multiplicity of individually spring biased poppets in a positioning plate, each with a brake friction surface or pad thereon to provide uniform brake pressure on the poppets under the urging of preloaded springs to provide uniform brake torque friction on the rotor discs and thus, achieve a desired initial stopping torque independent of unwanted axial deflection of the pressure or positioning plates.

Obviously, modifications and alterations will occur to others upon reading and understanding the preceding detailed description. It is intended that the exemplary versions described herein be construed as including all such modifications and alterations insofar as they come within the scope of the appended claims or the equivalents thereof.

The invention claimed is:

1. A disc brake assembly comprising:
    (a) a housing defining an annular fluid pressure cavity including an inlet adapted for connection to a source of pressurized fluid;
    (b) an annular piston having portions thereof sealingly disposed in the fluid pressure cavity;
    (c) an annular positioning plate secured to the housing and having a plurality of poppets each having a friction surface thereon disposed thereabout and individually movable in an axial direction with respect to the plate;
    (d) a plurality of springs disposed about the piston and operable to bias the poppets in a direction axially away from the piston;
    (e) at least one rotor having an annular friction surface disposed on an input shaft for rotation therewith and movable thereon in an axial direction; and,
    (f) an annular mounting plate with an annular friction surface connected to the piston wherein, upon fluid pressurization of the pressure cavity, the housing and positioning plate are moved axially away from the rotor, friction pads and mounting plate, and, upon depressurization of the pressure cavity, the springs are operable to move the friction pads into contact with the at least one rotor annular friction surface for effecting braking action.

2. The assembly defined in claim 1, wherein each of the poppets is attached to a member received through an aperture in the positioning plate.

3. The assembly of claim 1, wherein the at least one rotor comprises a plurality of rotors with adjacent rotors separated by an annular reaction plate axially movable with respect to the rotors, the reaction plate having friction material disposed thereon adjacent the annular friction surface of each rotor.

4. The assembly of claim 1, wherein the poppets are individually spring biased in an axial direction toward the rotor annular friction surface.

5. The assembly of claim 1, wherein the at least one rotor is spline-connected to the input shaft.

6. The assembly of claim 1, wherein each of the poppets has at least one of the plurality of springs biasing the poppet in a direction to contact the adjacent rotor disc.

7. The assembly of claim 1, wherein each of the poppets has a cavity therein receiving one end of one of the plurality of springs therein.

8. A method of making a disc brake assembly comprising:
    (a) providing a housing having an annular pressure cavity with an inlet for fluid pressurization;
    (b) disposing an annular piston moveably in the pressure cavity and sealing the piston thereon and forming a fluid pressure chamber;
    (c) connecting an annular mounting plate with an annular friction surface to the piston in axially spaced arrangement;
    (d) disposing at least one rotor having annular friction surfaces on axially opposite sides thereof axially intermediate the annular mounting plate and the piston;
    (e) disposing an annular positioning plate axially intermediate the at least one rotor and the piston and providing a plurality of circumferentially spaced poppets disposed about the annular positioning plate, each of the poppets having a friction surface thereon and being movable with respect to the annular positioning plate in an axial direction and connecting the positioning plate to the housing;
    (f) spring biasing each of the circumferentially spaced poppets individually to contact one of the at least one rotor annular friction surfaces with the respective poppet friction surface and spring biasing the friction material on the annular mounting plate into frictional contact with the rotor friction surface opposite the one friction surface with the pressure chamber unpressurized; and,
    (g) moving the housing and positioning plate with respect to the piston upon pressurization of the chamber and relieving the frictional contact on the rotor annular surfaces.

9. The method of claim 8, wherein providing a plurality of circumferentially spaced poppets comprises disposing a poppet through each of a plurality of apertures in the annular plate.

10. The method of claim 8, wherein disposing a poppet includes spring biasing the poppet in a direction to urge the friction pad thereon into contact with a rotor annular friction surface.

11. The method of claim 8, wherein disposing at least one rotor includes disposing a plurality of rotors and disposing an axially movable reaction plate with annular friction material between adjacent rotors.

* * * * *